United States Patent
Gahlmann

(10) Patent No.: US 8,614,269 B2
(45) Date of Patent: Dec. 24, 2013

(54) WATER-, SOLVENT- AND PLASTICIZER-FREE, SILANE-MODIFIED, ONE-COMPONENT PARQUET ADHESIVE AND USE THEREOF FOR GLUING PARQUET, WOODEN FLOOR COVERINGS AND WOOD-BASED MATERIAL BOARDS TO ALL SUB-FLOORS WHICH ARE COMMON IN INTERIOR FITMENT, EVEN THOSE WHICH ARE PROBLEMATIC

(75) Inventor: Frank Gahlmann, Hilchenbach (DE)

(73) Assignee: Stauf Klebstoffwerk GmbH (DE)

( * ) Notice: Subject to any disclaimer, the term of this patent is extended or adjusted under 35 U.S.C. 154(b) by 0 days.

(21) Appl. No.: 13/588,619

(22) Filed: Aug. 17, 2012

(65) Prior Publication Data

US 2013/0048193 A1 Feb. 28, 2013

Related U.S. Application Data

(63) Continuation-in-part of application No. PCT/EP2011/004196, filed on Aug. 19, 2011.

(30) Foreign Application Priority Data

Aug. 20, 2010 (DE) .......................... 10 2010 034 998

(51) Int. Cl.
*C09J 171/02* (2006.01)
(52) U.S. Cl.
USPC .................... 524/425; 156/71; 524/14; 524/3
(58) Field of Classification Search
USPC ........................................................ 524/425
See application file for complete search history.

(56) References Cited

U.S. PATENT DOCUMENTS

| 7,420,009 B2 | 9/2008 | Stauf et al. |
| 2011/0213058 A1 | 9/2011 | Yano |
| 2011/0232825 A1 | 9/2011 | Mack et al. |
| 2011/0237723 A1 | 9/2011 | Yano |

FOREIGN PATENT DOCUMENTS

| EP | 2011833 A1 | 1/2009 |
| EP | 2338938 A1 | 6/2011 |
| WO | WO-2007/093381 A1 | 8/2007 |
| WO | WO-2010/008154 A2 | 1/2010 |
| WO | WO-2010/035820 A1 | 4/2010 |
| WO | WO-2010/063740 A1 | 6/2010 |

OTHER PUBLICATIONS

"DURCAL 40 Marmormehi für Glasschleier", [online]. [retrieved Jan. 26, 2012]. Retrieved from the Internet: <URL: http://www.reinline.de/index.php?page=shop.product_details&flypage=flypage.tpl&product_id=460&category_id=32&vmcchk=1&option=com_virtuemart&Itemid=53>, (2012), 1 pg.
"International Application Serial No. PCT/EP2011/004196, International Search Report mailed Feb. 10, 2012", (w/ English Translation), 6 pgs.
Cadle, R., "Selection of Method of Particle Size Determination", *Particle Size Determination*, (1955), 92-101.

*Primary Examiner* — Doris Lee
(74) *Attorney, Agent, or Firm* — Schwegman Lundberg & Woessner, P.A.

(57) ABSTRACT

The present subject matter relates to a one-component, silane-modified water-, solvent- and plasticizer-free parquet adhesive and also to the use thereof for gluing parquet, wooden floor coverings and wood-based material boards to all sub-floors which are used in interior fitment, even those which are problematic.

20 Claims, No Drawings

WATER-, SOLVENT- AND PLASTICIZER-FREE, SILANE-MODIFIED, ONE-COMPONENT PARQUET ADHESIVE AND USE THEREOF FOR GLUING PARQUET, WOODEN FLOOR COVERINGS AND WOOD-BASED MATERIAL BOARDS TO ALL SUB-FLOORS WHICH ARE COMMON IN INTERIOR FITMENT, EVEN THOSE WHICH ARE PROBLEMATIC

CLAIM OF PRIORITY

This application is a continuation-in-part under 35 U.S.C. 111(a) of International Application No. PCT/EP2011/004196, filed on Aug. 19, 2011, and published on Feb. 23, 2012, as WO 2012/022493 A2, which claims the benefit of priority under 35 U.S.C. 119 to German Application No. 10 2010 034 998.4-43, filed on Aug. 20, 2010, the benefit of priority of each of which is claimed hereby, and each of which are incorporated by reference herein in its entirety.

TECHNICAL FIELD

The present subject matter relates to a one-component, silane-modified water-, solvent- and plasticizer-free parquet adhesive and also to the use thereof for gluing parquet, wooden floor coverings and wood-based material boards to all sub-floors which are common in interior fitment, even those which are problematic.

BACKGROUND

Parquet adhesives based on silane-modified, oligomeric compounds typically have the advantage of being processing—and application-friendly and also free of water, solvents and health-endangering substances, such as isocyanates, but have the disadvantage of being formulated with migratable components, such as plasticizers and/or non-reactive liquid extenders. The dissolving properties of these additives cause significant restrictions in the adhesion on sub-floors, such as mastic asphalt, which are susceptible thereto. In addition, in the case of correspondingly susceptible treatment agents for wooden floor surfaces such as acrylate- or polyurethane parquet water-based varnishes, they can cause solvation and dissolution in the joint region between two wooden floor elements.

OVERVIEW

The parquet adhesive according to the present subject matter can overcome these problems, such as by means of its special composition described in patent claim 1, based on at least two silane-terminated, moisture-reactive polyalkylene oxide oligomers with at least two mineral components and also suitable hardening catalyst, drying agent and adhesion promoter. Preferably, in addition at least one UV light absorber, antioxidant and rheological additive are contained. The terminal silane groups of the at least two polyalkylene oxide oligomers are bonded via alkyl groups to the oligomeric skeletal structure. The two polyalkylene oxide oligomers and the two mineral components are present in defined mixing ratios and are characterised with respect to type, structure, surface property and molecular weight or particle size. Drying agent and adhesion promoter contain moisture-reactive silane groups, preferably trimethoxysilane groups.

The parquet adhesive according to the present subject matter is free of water, solvents, health-endangering substances, plasticizers and non-reactive liquid extenders. It has the application- and processing-friendly advantageous properties of conventional silane-modified parquet adhesives. In addition, it has excellent adhesion properties on all sub-floors which are common in interior fitment, even those which are problematic. Treatment agents for wooden floor surfaces are not solvated or attacked by it.

The present subject matter relates to a one-component, silane-modified, water-, solvent-, and plasticizer-free parquet adhesive and also to the use thereof for gluing parquet, wooden floor coverings and wood-based material boards to all sub-floors which are used in interior fitment, even those which are problematic.

In the case of gluing wooden floor coverings, in particular parquet, adhesives are in demand, which enable simple handling and processing, entail no health risks, are environmentally-friendly, ensure a frictional, strong connection between covering wood and sub-floor, adhere well equally to all sub-floors and cause no dimensional changes and/or damage to the wooden floor covering.

These requirements are fulfilled to a respectively different degree by the adhesives which are commonly used for gluing wooden floor elements, in particular parquet. They are divided in detail into the following classes: dispersion adhesives, solvent adhesives, powder adhesives, methylene diisocyanate (MDT)-based two-component polyurethane adhesives, MDI-based one-component polyurethane adhesives, toluene diisocyanate (TDI)-based polyurethane adhesives and silane-modified polymeric adhesives (SMP-adhesives).

Dispersion adhesives based on vinyl acetate homopolymer dispersions have been used since the fifties for gluing parquet. They bond by evaporation of the water, the adhesion being based exclusively on physical interactions of the molecules (dipole-dipole-, van der Waals interactions). What is disadvantageous with these parquet adhesives which have been used to date is the high water content which can lead to significant swelling of the wood and consequently to dimensional changes in the parquet and other wooden floor coverings. Furthermore, the small amount of time which remains for laying the wooden floor covering element after application of the adhesive on the sub-floor (open time) and also the in part only moderate sub-floor adhesion are disadvantageous. The high glass transition temperature of the vinyl acetate homopolymers makes it necessary in addition to use coalescent agents in order to achieve filming of the dispersion at the processing temperature (room temperature). Coalescent agents are volatile organic compounds (VOCs) which, even after gluing of the parquet, are still discharged in the room air for a fairly long period of time and hence can represent environmental and health risks.

A further development of the dispersion parquet adhesives based on vinyl acetate homopolymer dispersions are the parquet adhesives based on vinyl acetate-ethylene copolymer dispersions. In the case of these similarly formulated adhesives, the lower glass transition temperature of the copolymer dispersions requires no coalescent agents. In addition, also special dispersions based on styrene acrylic acid ester copolymers are used nowadays. These adhesives can be formulated likewise without coalescent agents because of the low glass transition temperature of the dispersions. However, the wood-swelling properties, the short open times (10 to 20 minutes) and the only moderately pronounced adhesion properties continue to be disadvantageous.

Solvent-synthetic resin parquet adhesives can be based on solutions of vinyl acetate homopolymers in a solvent mixture which can comprise methanol, ethanol, methyl acetate, ethyl acetate and acetone. They bond very rapidly by evaporation of the solvent. What is advantageous with these parquet adhesives used to date are the wood-swelling properties Which are reduced by approx. 50 to 70% in comparison with dispersion parquet adhesives. However, the high content of solvents, the emission of which means a burden to the processor and to the environment, is disadvantageous and consequently use in interiors is limited. The products are generally characterised as readily-inflammable and health-damaging or irritant. In addition, the open times of these parquet adhesives are particularly short (5 to 10 minutes) and hence disadvantageous for the processing process. The adhesion properties are better than those of dispersion adhesives.

An advantageous further development of these parquet adhesives, with respect to solvent emissions, is found in a patent of Stauf Klebstoffwerk GmbH (U.S. Pat. No. 7,420, 009 B2: LOW EMISSION ADHESIVE COMPOSITION BASED ON A SOLVENT).

A development of the dispersion parquet adhesives is pulverulent adhesive formulations. These are based on re-emulsifiable dispersion powders—generally vinyl acetate-ethylene copolymers. They contain a mineral component which can comprise calcium sulphate hemihydrate, Portland cement or aluminate cement. These adhesives concern 2-component systems which consist of powder and a further component. The second component which is mixed with the powder component is water or a polymer dispersion. The advantage of this class of parquet adhesives is the chemical water bonding of the mineral component. The disadvantageous wood swelling of the dispersion adhesives is reduced consequently to approximately the level of solvent parquet adhesives. The limited pot life between mixing the components and the end of the processing in which the chemical reaction takes place which increasingly effects a viscosity increase is disadvantageous. The laying time (open time) between the application of the adhesive and laying of the wooden floor element is just as short as in the case of dispersion parquet adhesives. In addition, the difficulties which are basically inherent to all two-component systems and reside in the additional mixing complexity, in the danger of non-homogeneous mixing and in inadequate adjustment of the mixing ratio by the user are disadvantageous. The adhesion properties correspond to those of the dispersion parquet adhesives.

Reaction adhesives based on polyurethane can be used for gluing parquet. These can include 2-component systems which consist of a resin component and an isocyanate hardener. The binding agent in the resin component is a hydroxy-functional polyol; the formulated resin component contains in addition water scavengers, mineral fillers, catalysts and additives. The isocyanate hardener component generally consists of commercial, oligomeric methylene diphenyldiisocyanate (MDI, often also termed polymer MDI). In the case of these adhesives, the wood-swelling effect which is again reduced in comparison with powder parquet adhesives and hence no longer relevant in practice and also the longer open times of approx. 30 to 60 minutes are advantageous. Furthermore, the strengths and adhesion properties which ensure an extremely frictional connection of the covering wood to all sub-floors which are common in interior fitment, even those which are problematic, are advantageous. However, the danger to health and environment which is based on the isocyanate content and is expressed inter alia in the hazardous material labelling according to the German Ordinance on Hazardous Substances or the international GHS system is disadvantageous. Accordingly, these adhesives are classed as health-damaging, irritant and sensitising. Furthermore, the problems which are basically inherent to all two-component systems, as were described already in the case of powder adhesives, are disadvantageous.

In addition to the two-component polyurethane adhesives, reactive one-component polyurethane parquet adhesives can be used. The basis of these adhesives is isocyanate group-containing, moisture-reactive prepolymers based on methylene diphenyldiisocyanate (MDI) Which often also comprise oligomeric and monomeric MDI. Further components of these adhesives are mineral fillers, catalysts and additives. In comparison with two-component polyurethane adhesives, the again extended open times are advantageous and facilitate handling and processing of the adhesives together with the one-component aspect. The wood-swelling effect corresponds to that of two-component polyurethane adhesives and is correspondingly unproblematic. The adhesion properties correspond to those of the solvent parquet adhesives and ensure good adhesion on common sub-floors. However, what is disadvantageous in one-component polyurethane adhesives is furthermore the danger to health and environment, which corresponds to that of two-component polyurethane parquet adhesives, and is based on a residual content of monomeric and oligomeric MDI in the prepolymers.

One-component reaction adhesives based on toluene diisocyanate oligomers (TDI adhesives) can be used for gluing wooden floor coverings. In comparison with the established MDI-based polyurethane adhesives, the advantage of these adhesives is that they are not classed as health-damaging, irritant or sensitising and they do not require a specific labelling according to the German Ordinance on Hazardous Substances and the international GHS labelling system. This property can be attributed to their extremely low residual content of monomeric TDI. With respect to the open time and wood-swelling properties, they are similar to the MDI-based polyurethane adhesives. However, in comparison with these, the only moderately pronounced adhesion properties are disadvantageous. Although the adhesion with these adhesives, in addition to physical interactions, is based also on formation of covalent chemical bonds, it is no better than in the case of the dispersion- and powder parquet adhesives.

Parquet adhesives can be based on silane-modified, oligomeric compounds, so-called SMP adhesives (now and then also termed hybrid adhesives). These adhesives are characterised by oligomeric organic compounds (frequently also termed prepolymers) which carry moisture-reactive silane groups, generally dimethoxymethyl- or trimethoxysilane groups. After contact with moisture from the sub-floor, the covering wood or the air, the moisture-reactive silane groups crosslink by means of hydrolysis and subsequent condensation to form a three-dimensional siloxane network, the adhesive matrix.

Further components of these adhesives are liquid extenders, plasticizers, mineral fillers, water scavengers, adhesion promoters, catalysts and further additives. For the gluing of parquet, silane-modified adhesives generally have the following advantages:
  one-component aspect
  free of water and solvents
  sufficiently long open times
  no relevant wood-swelling effect in practice
  not classed as environment- or health-endangering and therefore need no labelling according to the German Ordinance on Hazardous Substances and the international GHS labelling system.

The pseudo-plastic rheology of SMP parquet adhesives is furthermore advantageous. In practice, this means that the adhesives do not flow and can be applied well with a toothed spatula. Drawn tracks of adhesive remain stable in shape and hence offer an important pre-condition of being able to bridge fairly small cavities between wooden floor covering and sub-floor.

Silane-modified parquet adhesives typically comprise plasticizers and/or non-reactive liquid extenders which reduce the viscosity of the adhesive and ensure necessary processing properties. Unfortunately they are also responsible for a series of technical application problems and restrictions. The dissolving properties of these migratable liquids cause in particular solvation of mastic asphalt as sub-floor and also solvation of dispersion primers used typically as primer and based on vinyl acetate-ethylene-, styrene-acrylate- or acrylic acid ester copolymers. Therefore in the case of silane-modified parquet adhesives, problems with adhesion on this type of sub-floors must basically be taken into account—a circumstance which has to date militated against greater acceptance and use of these parquet adhesives. Furthermore, because of the migration of liquid components for correspondingly susceptible coatings and/or treatments of the covering wood, such as parquet water-based varnishes, the danger of solvation or dissolution exists, which can lead, in particular in the joint region, close to the adhesive, between two parquet elements, to unattractive impairments to the appearance.

Cyclohexane dicarboxylic acid derivatives as plasticizer for silane-modified adhesives and sealants are disclosed in detail in the patent document WO 2010/063740 A1.

The present subject matter can make available a parquet adhesive which has all or several of the following advantages: it should be easy to apply, ensure a sufficiently long open time, have no relevant wood-swelling effect, not endanger health and environment, be free of water, solvents, plasticizers and non-reactive liquid extenders, have good adhesion properties on all sub-floors which are common, even solvatable, in interior fitment and not solvate treatment agents for wooden floor surfaces. The present subject matter can make available the use of the parquet adhesive according to the invention for gluing parquet, wooden floor coverings and wood-based material boards with the objectives indicated for the parquet adhesive.

This can be achieved by the one-component, silane-modified, water-, solvent- and plasticizer-free parquet adhesive according to claim 1, and also use thereof according to claim 9. Advantageous developments of the parquet adhesive according to the present subject matter and of the use according to the present subject matter are indicated in other claims, such as the respective dependent claims.

The parquet adhesive according to the present subject matter can include a silane-modified parquet adhesive with significantly improved adhesion properties and low dissolution capacity relative to substrates. It has the technical processing and application advantages of the silane-modified adhesives corresponding to the state of the art without including their migratable non-reactive components and having the adhesion and solvation problems associated therewith. All the liquids contained in the adhesive according to the invention comprise terminal silane groups and are bonded covalently in the polysiloxane network. The possibility of completely dispensing with non-reactive liquids and the advantageous properties, associated therewith, of the parquet adhesive according to the invention can essentially be attributed to a suitable combination of respectively at least two selected basic polymers having at least two special mineral components. The basic polymers are characterised with respect to structure and molecular weight and the mineral components with respect to type, surface quality and particle size. In addition, also the selection of a suitable hardening catalyst, drying agent and adhesion promoter are responsible for the advantageous adhesive properties.

Molecular weight data of all oligomers and polymers specified within the framework of this invention (especially those of silane-terminated polyalkylene oxide binding agents of adhesive compositions according to the invention and reference adhesive compositions) are average number molecular weights ($M_n$), as it is standard in this technical field.

According to the present subject matter, the one-component, silane-modified, water solvent- and plasticizer-free parquet adhesive which comprises no non-reactive liquid extenders and is suitable for gluing parquet, wooden floor coverings and wood-based material boards to all sub-floors which are common in interior fitment, even those which are solvatable and problematic, comprises the following materials or consists of them:

a) 12 to 36 per cent by mass of a moisture-reactive, silane-terminated polyalkylene oxide binding agent with an average molecular weight of 6,000 to 20,000 g/mol, the silane functions being bonded via alkyl groups to the oligomeric skeletal structure, b) 2 to 18 per cent by mass of a moisture-reactive, silane-terminated polyalkylene oxide binding agent with an average molecular weight of 300 to 3,000 g/mol, the silane functions being bonded via alkyl groups to the oligomeric skeletal structure.

c) 30 to 60 per cent by mass of a surface-hydrophobised marble powder with an average particle diameter of 0.8 µm to 4.0 µm, d) 2 to 10 per cent by mass of a surface-hydrophobised chalk powder with an average particle diameter of 0.2 to 0.7 µm, e) 0.1 to 1.0 per cent by mass of a hardening catalyst, f) 0.2 to 3 per cent by mass of a moisture-reactive, silane-modified drying agent, g) 0.2 to 3 per cent by mass of a moisture-reactive, silane-modified adhesion promoter, the percentage data relating to the mass of the ready-to-use parquet adhesive and the sum of the components a) to a) being 46.5% to 100%.

In particular, the parquet adhesive can have the following proportions of components:

a) 23 to 33 per cent by mass of a moisture-reactive silane-terminated polyalkylene oxide binding agent with an average molecular weight of 7,000 to 13,000 g/mol, the silane functions being bonded via alkyl groups to the oligomeric skeletal structure, b) 7 to 13 per cent by mass of a moisture-reactive, silane-terminated polyalkylene oxide binding agent with an average molecular weight of 700 to 1,300 g/mol, the silane functions being bonded via alkyl groups to the oligomeric skeletal structure, c) 48 to 60 per cent by mass of a surface-hydrophobised marble powder with an average particle diameter of 1.0 µm to 3.0 µm, d) 3 to 7 per cent by mass of a surface-hydrophobised chalk powder with an average particle diameter of 0.3 to 0.6 µm, e) 0.15 to 0.29 per cent by mass of a hardening catalyst, f) 0.5 to 1.5 per cent by mass of a moisture-reactive, silane-modified drying agent, g) 0.5 to 1.5 per cent by mass of a moisture-reactive, silane-modified adhesion promoter, the percentage data relating to the mass of the ready-to-use parquet adhesive and the sum of the components a) to g) being 82.15% to 100%.

A preferred embodiment provides that the mass ratio of component a) to component b) is 1:1 to 8:1 and the mass ratio of component c) to component d) is 5:1 to 20:1. In particular, it is advantageous if the mass ratio of component a) to component b) is 2:1 to 4:1 and the mass ratio of component c) to component d) is 8:1 to 18:1.

As binding agent and basic polymer, the parquet adhesive according to the invention comprises 12 to 36 per cent by mass, preferably 23 to 33 per cent by mass, very particularly preferred 28 per cent by mass of a moisture-reactive, silane-terminated polyalkylene oxide, the silane functions of which are bonded via alkyl groups to the oligomeric skeletal structure. In an example, the oligomeric skeletal structure is a polypropylene oxide and the silane functions are dimethoxymethylsilane groups. The average molecular weight of the oligomer is between 6,000 and 20,000 g/mol, preferably between 7,000 and 13,000 g/mol, very particular preferred are 10,000 g/mol.

As binding agent and reactive diluent, the parquet adhesive according to the present subject matter comprises 2 to 18 per cent by mass, preferably 7 to 13 per cent by mass, very particularly preferred 10 per cent by mass of a moisture-reactive, silane-terminated polyalkylene oxide, the silane functions of which are bonded via alkyl groups to the oligomeric skeletal structure. In an example, the oligomeric skeletal structure is a polypropylene oxide and the silane functions are dimethoxymethylsilane groups. The average molecular weight of the oligomer is between 300 and 3,000 g/mol, preferably between 700 and 1,300 g/mol, very particularly preferred are 1,000 g/mol.

At least one mineral component is a marble powder with an average particle size of 0.8 to 4.0 µm, preferably 1.0 to 3.0 µm, very particularly preferred 2.0 µm. The marble powder is contained at 30 to 60 per cent by mass, preferably 48 to 60 per cent by mass, very particularly preferred 55 per cent by mass in the parquet adhesive according to an embodiment of the present subject matter.

At least one further mineral component is a chalk powder with an average particle size of 0.2 to 0.7 µm, preferably 0.3 to 0.6 µm, very particularly preferred 0.4 µm. The chalk powder is contained in the parquet adhesive according to the invention at 2 to 10 per cent by mass, preferably 3 to 7 per cent by mass, very particularly preferred 4 per cent by mass.

Substitution of chalk and/or marble by precipitated calcium carbonate powders is not possible since these have smaller particle sizes than those required according to the invention. Likewise, the substitution of the chalk and/or the marble by other calcium carbonate stone, such as limestone, does not lead to the advantages according to the invention.

The surfaces of the chalk- and marble particles are hydrophobised, the hydrophobising being effected either by treatment with one or more fatty acids and/or its salt/their salts, preferably by treatment with stearic acid and/or stearate or via silanisation, preferably by conversion with a reactive silane, very particularly preferred by conversion with aminosilane.

In order to accelerate the hardening process, the parquet adhesive according to the present subject matter can comprise 0.1 to 1.0 per cent by mass, preferably 0.15 to 0.29 per cent by mass, very particularly preferred 0.29 per cent by mass of a hardening catalyst. Organo-transition metal compounds can be preferred hardening catalysts; dibutyltin diacetylacetonate can be very particularly preferred.

As water scavenger, the parquet adhesive according to the present subject matter can comprise 0.2 to 3 per cent by mass, preferably 0.5 to 1.5 per cent by mass, very particularly preferred 0.8 per cent by mass of a moisture-reactive, silane-modified drying agent. Trimethoxysilane-terminated alkenes are preferably used; vinyl trimethoxysilane is very particularly preferred.

In order to improve the adhesion properties, the parquet adhesive according to the present subject matter can comprise 0.2 to 3 per cent by mass, preferably 0.5 to 1.5 per cent by mass, very particularly preferred 1.0 per cent by mass of a moisture-reactive, silane-modified adhesion promoter. Trimethoxysilane-terminated aminoalkyl compounds are preferably used; 3-aminopropyltrimethoxysilane is very particularly preferred.

In order to improve storage life, the parquet adhesive according to the present subject matter can comprise in addition antioxidants and/or UV light absorbers (photostabilisers) of together up to 3 per cent by mass, preferably 0.2 to 1 per cent by mass, very particularly preferred 0.21 per cent by mass.

As antioxidant, preferably sterically hindered phenols are used, preferably 3,5-bis(1,1-dimethylethyl)-4-hydroxybenzylpropanoic acid-C7-C9-isoalkylester.

As UV light absorber, preferably sterically hindered amines are used, preferably bis(1,2,2,6,6-pentamethyl-4-piperidyl)sebacate or methyl-1,2,2,6,6-pentamethyl-4-piperidylsebacate; a mixture of these sebacates is very particularly preferred.

As theological additive, the parquet adhesive according to the present subject matter can comprise in addition up to 3 per cent by mass, preferably 0.3 to 1.3 per cent by mass, very particular preferred 0.7 per cent by mass of a wax, preferably a polyamide wax.

The individual components of the adhesive composition according to the present subject matter can be contained respectively as pure materials or, provided that the criteria applying to the respective component, such as total proportion, mass ratio, molecular weight, structure, chemistry, particle size and/or surface quality remain fulfilled, as a mixture of similar materials.

In order to improve or adjust appearance, rheology and/or stability, the parquet adhesive according to the invention can comprise further additives, such as pigments, colourants, organic/inorganic fillers, resins, waxes or preservatives.

The use of plasticizers and non-reactive liquid extenders can be dispensed with completely because of their migratability and dissolving properties. The composition according to the present subject matter of the parquet adhesive has the effect that this does not have a disadvantageous effect, rather the advantageous properties of silane-modified parquet adhesives are retained. Moreover, the adhesion properties can be significantly improved and the undesired solvation of substrate surfaces can be avoided.

The parquet adhesive according to the present subject matter has a series of technical processing and application advantages which no other parquet adhesive combines together in this combination:
  one-component aspect
  free of plasticizers and non-reactive liquid components and also of water and solvents
  sufficiently long open time
  no relevant wood-swelling effect in practice
  free of environment- and health-endangering substances
  labelling-free according to the current GHS labelling system and the German Ordinance on Hazardous Substances
  pronounced pseudo-plastic rheology with suitable processing viscosity
  easy applicability by means of toothed spatula and structure-retaining adhesive tracks excellent adhesion properties on all moist and dry sub-floors which are common in interior fitment, even those which are problematic no solvation or attack of treatment agents for wooden floor surfaces, in particular parquet water-based varnishes very extensive field of application easy and reliable handling and application The parquet adhesive according to the present subject matter can be one-component and free of water, solvents, plasticizers, non-reactive liquid extenders and other migratable components.

The open time is in the range of 60 to 100 minutes (DIN EN 14293:2006-10), as a result of which a comparatively long processing time is ensured.

Because of the absence therefrom of water and solvents, no relevant wood-swelling effect of the adhesive is present in practice.

The absence of solvents and completely dispensing with the addition of plasticizers, isocyanates and other potentially health-endangering substances causes the health- and environment-compatibility of the parquet adhesive according to the present subject matter. This can be observed in the fact that the adhesive does not require to be labelled according to the current German Ordinance on Hazardous Substances and the international GHS hazardous material labelling system.

The pronounced pseudo-plastic rheology and viscosity between 60,000 and 120,000 mPa·s (test conditions according to DIN EN ISO 2555:2000-01, 20 revolutions per minute) ensure, together with the one-component aspect, simple processing of the adhesive according to the present subject matter. The adhesive can be applied easily with a toothed spatula and allows adhesive tracks, which are stable in shape, up to a height of 10 mm.

The parquet adhesive according to the present subject matter can have excellent adhesion properties on all sub-floors which used in interior fitment, such as mastic asphalt, concrete, cement, cement screed, cement liquid screed, cement mortar, cement-bonded wood fibre, ceramic, natural stone, calcium sulphate screed, calcium sulphate liquid screed, magnesite screed, wood, wood-based material, plywood, cork, gypsum, gypsum fibre, gypsum plasterboard, hardboard, knifing filler, primers, textile fibrous material, natural and synthetic polymeric material or a combination of these sub-floors. The adhesion is also ensured on sub-floors comprising up to 8 per cent by mass of water, such as e.g. moist concrete or cement screed.

Commercially available parquet, wooden floor coverings and/or wood-based material boards which consist entirely or partially of European deciduous and/or coniferous types of timber, non-European types of timber or a combination of these types of timber are glued reliably and frictionally to the sub-floor.

Treatment agents for wooden floor surfaces, in particular parquet water-based varnishes, are not solvated or attacked by the parquet adhesive according to the present subject matter.

The very wide field of use, simple handling and the advantageous processing properties of the parquet adhesive according to the present subject matter can ensure simple and reliable application. The user requires no technical constructional and/or chemical expert- or previous knowledge. Hence, the parquet adhesive according to the present subject matter is even suitable for application by laypersons.

In Table 1, an embodiment of the parquet adhesive according to the present subject matter having a particularly preferred composition is given.

In Table 4 and 5, the compositions of the commercially available parquet adhesives SMP-920 and SMP-930 (Stauf Klebstoffwerk GmbH) are summarised. In comparative tests, they serve as reference for the adhesive according to the invention.

In the composition thereof, the two commercially available parquet adhesives differ from the parquet adhesive according to the present subject matter essentially by a different composition of basic polymer and mineral components and also the proportion thereof of plasticizer. Surface-hydrophobised marble powder—a mineral main component of the adhesive according to the present subject matter—is not contained in the commercially available adhesives. Conversely, both commercially available adhesives comprise limestone powder and partially also precipitated calcium carbonates and silicic acid which do not occur in the parquet adhesive according to the invention. Also the average particle diameters and the distribution profiles thereof differ between adhesive according to the invention and the commercially available formulations. Thus, for example particle sizes of mineral components of >4 μm are not contained in the parquet adhesive according to the present subject matter.

A further difference is the plasticizer content which, in the case of SNIP-930, is 15 per cent by mass and, in the case of SMP-920, is 20 per cent by mass of the ready-to-use adhesive mixture. In contrast, no plasticizer is contained in the parquet adhesive according to the invention. SMP-920 consists of up to 20 per cent by mass of diisononylphthalate. SMP-930 comprises 11 per cent by mass of bis(2-propylheptylphthalate) and 4 per cent by mass of phenolalkylsulphonic acid as plasticizer. Against the background of a reproduction-damaging effect of the phthalates and undesired plasticizer effects, SMP-930 should be regarded as of higher quality in comparison with SMP-920.

With the parquet adhesive according to the present subject matter, such as described in Table 1, the strength of the adhesive adhesion on different sub-floors was determined and compared with the commercially available, silane-modified parquet adhesives (SMP-920 and SMP-930 Stauf Klebstoffwerk GmbH).

As sub-floor, a wood-based material board coated with mastic asphalt, a fibre-reinforced cement board primed with VDP 160 (dispersion primer based on styrene-acrylate, Stauf Klebstoffwerk GmbH) and an uncoated concrete slab (strength class C 20/25 according to DIN EN 206-1:2001-07) was selected. The shear strength which was determined according to DIN EN 14293:2006-10 (storage type A, 40° C.) served as measuring parameter. The procedure in the test was such that the sub-floors to be coated were initially coated with mastic asphalt (layer thickness 25 mm) or VDP 160 (layer thickness 0.2 mm) and subsequently left to dry for 24 hours in a standard atmosphere (23° C., 50% relative air humidity). The concrete slab was likewise stored simultaneously for 24 hours in a standard atmosphere. Subsequently, the sub-floors were coated uniformly with a 0.85 mm thick adhesive layer and the slats of beech were pressed into the adhesive layer. After storage for seven days in a climatic chamber at 20° C. and 50% relative air humidity, the temperature was increased to 50° C. and conditioned for a further 7 days at 50% relative air humidity. Subsequently, the test pieces were conditioned for 24 hours in a standard atmosphere. The shear testing was now effected according to DIN ET 14293:2006-10, the measuring values displayed in Table 2 resulting.

The results show that the parquet adhesive according to the present subject matter on the concrete sub-floor, which is unproblematic from a technical adhesion point of view, has a shear strength which is higher by 24% in comparison with SMP-930 and, in comparison with SMP-920, even a shear strength higher by 36%. On sub-floors which can be solvated by plasticizer and liquid-extender and therefore rather problematic, this difference is displaced further in favour of the adhesive according to the present subject matter. Thus, it has a shear strength increased by 1,818% on mastic asphalt in comparison with SMP-930, which increases even to 2,538% in comparison with SMP-920. With the dispersion primer VDP160, similarly significant results are achieved. The parquet adhesive according to the present subject matter on this sub-floor has a shear strength increased by 65%, in comparison with SNP-930, and a shear strength increased by 1,084% in comparison with SNP-920.

It is evident from these data that the parquet adhesive according to the present subject matter, in contrast to the commercially available, shone-modified parquet adhesives, can have a comparatively high shear strength of greater than or equal to 2.0 N/mm$^2$ and can ensure this even on problematic sub-floors. The adhesion properties of the parquet adhesive according to the present subject matter can therefore be classed as significantly better than the commercially available, silane-modified parquet adhesives.

In the following experiment, the solvating and softening effect of the parquet adhesive according to the present subject matter on parquet water-based varnishes was investigated and compared with the commercially available, silane-modified parquet adhesives (SMP-920 and SMP-930, Stauf Klebstoffwerk GmbH) with plasticizer proportions of 20 (SMP-920) and 15 per cent by mass (SMP-930). Commercially available, one-component systems based on polyurethane-/acrylate dispersion (Aqua-Seal® EcoGold W3, Berger-Seidle Siegeltechnik GmbH and LOBADUR® WS Global, Loba GmbH & Co. KG) with comparatively less resistance relative to plasticizers and liquid extenders were selected as parquet water-based varnish.

For the investigation, the corresponding adhesive was applied over the Whole surface on the rear-side of a multilayer parquet element having the dimensions length=600 mm, width=75 mm, thickness=11 mm. The rear-side of the multilayer parquet elements all had 5 cm rectangular incisions of a width of 2 mm and a depth of 6 mm, the incisions being oriented parallel to the narrow edge of the parquet elements. One parquet slat had in total 11 incisions.

For application of the adhesive, these were filled with adhesive and a smooth spatula was drawn over the entire rear-side of the parquet element such that only adhesive remained in the incisions. After a hardening time of 7 days at 20° and 50% relative air humidity, the rear-side of the parquet elements was sanded so that the wood surface was rough again. In the region of the incisions, the adhesive remained.

The surface was now varnished over the whole area with water-based varnish. 3 layers of varnish with an application quantity of respectively 110 g/m$^2$ were applied, an intermediate sanding being effected after the first and second application respectively. After placing in a climatic chamber and 3 days drying at 20° C. and 50% relative air humidity, the test pieces were conditioned further at 50° C. and 50% relative air humidity. After a storage duration of 3, 20 and 45 days, the test pieces were tempered respectively within 3 hours down to 20° C. and removed from the climatic chamber.

As test substance, the gap filling composition powder Pafuki of Berger-Seidle Siegeltechnik GmbH, Grünstadt was scattered onto the surface of the parquet elements and blown off again after an effective time of 10 seconds. The discolouration of the varnished surface was then assessed visually according to a five-stage, semi-quantitative classification system, there being meant 1=no discolouration, 2=minimal discolouration, 3=slight discolouration, 4=significant discolouration and 5=pronounced discolouration. In the region of the incisions in which the varnishes were applied on the adhesives, and also the edges thereof, permanent discolourations which were strongly pronounced to a different degree could be detected. These can be attributed to the solvation and softening of the water-based varnishes as a result of the effect of migratable solvating adhesive components (softener and/or liquid-extender).

In order to be able to assess whether the discolourations remaining after blowing-off of the test substance (dry cleaning) are able to be washed off, the test piece surfaces were washed off (wet cleaning) with surfactant-containing water after the first assessment of discolouration, dried and subsequently subjected to renewed assessment.

The results of these experiments are listed in Table 3. They indicate that the adhesive according to the invention, in contrast to commercially available SMP adhesives, has at no time a solvating or softening effect on the investigated polyurethane-acrylate water-based varnishes. Since the investigated one-component water-based varnishes belong to water-based varnishes which are less resistant to plasticizers and liquid-extenders, no solvating or softening effect by the parquet adhesive according to the invention should be anticipated also with other, more highly resistant, e.g. two-component, water-based varnishes.

The open time of the adhesive according to the present subject matter (e.g., composition according to Table 1) was determined according to DIN EN 14293:2006-10. It was 75 minutes, e.g., within this time period after application of the adhesive, parquet coverings can still be pressed into the adhesive layer and glued to the sub-floor. Also lifting of already laid coverings and new alignment thereof can be readily implemented within this time period.

The viscosity according to DIN EN ISO 2555:2000-01 was determined with the parquet adhesive according to the invention which is described in Table 1. A viscosity of 91,200±6, 300 mPa·s was measured (n=5, 20 revolutions per minute). The viscosity is hence in the range of 60,000 to 120,000 mPa·s, which ensures easy applicability and adhesive tracks, which are stable in shape, up to a height of 1 mm. In combination with the one-component aspect and the open time, easy handling and processing of the parquet adhesive according to the invention results therefrom.

TABLE 1

By way of example, particularly preferred composition of the parquet adhesive according to the invention (proportions in percent by mass).

| Raw material | Chemistry | Function | Manufacturer | Proportion [%] |
|---|---|---|---|---|
| SAX 260 | Dimethoxymethylsilane-terminated polypropylene oxide oligomer, MW: approx. 10,000 g/mol | Binding agent, basic polymer | Kaneka | 28.0 |

TABLE 1-continued

By way of example, particularly preferred composition of the parquet adhesive according to the invention (proportions in percent by mass).

| Raw material | Chemistry | Function | Manufacturer | Proportion [%] |
|---|---|---|---|---|
| SAT 010 | Dimethoxymethylsilane-terminated polypropylene oxide oligomer, MW: approx. 1,000 g/mol | Binding agent, reactive diluent | Kaneka | 10.0 |
| Omyabond 302 | Chalk powder, surface-hydrophobised with stearic acid, average particle diameter: 0.4 μm | Mineral component | Omya | 4.0 |
| Omyabond 520 FL | Marble powder, surface-hydrophobised with stearic acid, average particle diameter: 2.0 μm | Mineral component | Omya | 55.0 |
| Metatin K 740 | Dibutyltin diacetylacetonate | Catalyst | Acima | 0.29 |
| Geniosil XL 10 | Vinyl trimethoxysilane | Drying agent | Wacker Chemie | 0.80 |
| Geniosil GF 96 | 3-aminopropyltrimethoxysilane | Adhesion promoter | Wacker Chemie | 1.0 |
| Tinuvin 765 | Mixture of bis(1,2,2,6,6-pentamethyl-4-piperidyl)sebacate and methyl-1,2,2,6,6-pentamethyl-4-piperidylsebacate | UV light absorber | Ciba | 0.06 |
| Irganox 1135 | 3,5-bis(1,1-dimethylethyl)-4-hydroxybenzylpropanoic acid-C7-C9-isoalkylester | Antioxidant | Ciba | 0.15 |
| Disparlon 6100 | Polyamide wax | Rheological additive | Kusumoto | 0.70 |

TABLE 2

Results of the tension shear strength test according to DIN EN 14293:2006-10 (storage type A) on parquet adhesive according to the invention, SMP-930 and SMP-920 on various sub-floors. Measuring values ± standard deviation (SD) and also number of respective measurements (n).

| Adhesive | Tension shear strength ± SD on mastic asphalt |
|---|---|
| Adhesive according to the invention (composition according to Table 1) | 2.11 ± 0.22 N/mm² (n = 7) |
| SMP-930 | 0.11 ± 0.07 N/mm² (n = 6) |
| SMP-920 | 0.08 ± 0.06 N/mm² (n = 6) |
|  | Tension shear strength ± SD on primer VDP160 |
| Adhesive according to the invention (composition according to Table 1) | 2.25 ± 0.26 N/mm² (n = 7) |
| SMP-930 | 0.26 ± 0.08 N/mm² (n = 6) |
| SMP-920 | 0.19 ± 0.09 N/mm² (n = 6) |
|  | Tension shear strength ± SD on concrete slab |
| Adhesive according to the invention (composition according to Table 1) | 2.30 ± 0.20 N/mm² (n = 7) |
| SMP-930 | 1.85 ± 0.17 N/mm² (n = 7) |
| SMP-920 | 1.69 ± 0.21 N/mm² (n = 6) |

TABLE 3

Results relating to the solvating and softening effect of different parquet adhesives, (parquet adhesive according to the invention according to Table 1, SMP-920 and SMP-930) on two one-component parquet water-based varnishes (LOBADUR WS Global and Aqua-Seal EcoGold W3) after 3, 20 and 45 days of duration of the effect. Assessment of the discolouration according to 5-stage assessment system (5 = poorest, 1 = best result) of respectively 11 individual samples after blowing-off (dry cleaning) and wiping-off (wet cleaning) of the sample surface.

|  | After 3 days | | After 20 days | | After 45 days | |
|---|---|---|---|---|---|---|
|  | Dry cleaning | Wet cleaning | Dry cleaning | Wet cleaning | Dry cleaning | Wet cleaning |
| Water-based varnish Aqua-Seal ® EcoGold W3 | | | | | | |
| SMP-930 | 5 | 5 | 5 | 5 | 5 | 5 |
| SMP-920 | 5 | 5 | 5 | 5 | 5 | 5 |
| Adhesive according to the invention | 1 | 1 | 1 | 1 | 1 | 1 |
| Water-based varnish LOBADUR ® Global | | | | | | |
| SMP-930 | 5 | 4 | 5 | 4 | 5 | 4 |
| SMP-920 | 5 | 5 | 5 | 5 | 5 | 5 |
| Adhesive according to the invention | 1 | 1 | 1 | 1 | 1 | 1 |

Legend
Pronounced discolouration = 5
Significant discolouration = 4
Slight discolouration = 3

TABLE 3-continued

Results relating to the solvating and softening effect of different parquet adhesives, (parquet adhesive according to the invention according to Table 1, SMP-920 and SMP-930) on two one-component parquet water-based varnishes (LOBADUR WS Global and Aqua-Seal EcoGold W3) after 3, 20 and 45 days of duration of the effect. Assessment of the discolouration according to 5-stage assessment system (5 = poorest, 1 = best result) of respectively 11 individual samples after blowing-off (dry cleaning) and wiping-off (wet cleaning) of the sample surface.

| After 3 days | | After 20 days | | After 45 days | |
|---|---|---|---|---|---|
| Dry cleaning | Wet cleaning | Dry cleaning | Wet cleaning | Dry cleaning | Wet cleaning |

Minimal discolouration = 2
No discolouration = 1

TABLE 4

Composition of the commercially available parquet adhesive SMP-920 (Stauf Klebstoffwerk GmbH; proportions in percent by mass).

| Raw material | Chemistry | Function | Manufacturer | Proportion [%] |
|---|---|---|---|---|
| S 203 H | Dimethoxymethylsilane-terminated polypropylene oxide oligomer; MW: approx. 12,000 g/mol | Binding agent, basic polymer | Kaneka | 11 |
| S 303 H | Dimethoxymethylsilane-terminated polypropylene oxide oligomer; MW: approx. 18,000 g/mol | Binding agent, basic polymer | Kaneka | 6 |
| Silquest A-171 | Vinyl trimethoxysilane | Drying agent | Momentive | 0.7 |
| Silquest A-1637 | 4-amino-3,3-dimethylbutyltrimethoxysilane | Adhesion promoter | Momentive | 0.7 |
| TIB KAT 223 | Dioctyltin-bis(2,4-pentanedionate) | Catalyst | TIB Chemicals | 0.34 |
| Irganox 1726 | 4,6-bis(dodecylthiomethyl)-o-cresol | Antioxidant | Ciba | 0.1 |
| DINP | diisononylphthalate | Plasticizer | BASF | 20 |
| Crayvallac SLX | Polyamide wax | Rheological additive | Cray Valley | 0.4 |
| Omya BLP 3 | Limestone powder, surface-hydrophobised with stearic acid, average particle diameter: 5.7 µm | Mineral component | Omya | 19.5 |
| Calcilit 6 HS | Limestone powder, surface-hydrophobised with stearic acid, average particle diameter: 7 µm | Mineral component | Alpha-Calcit | 8.66 |
| MS 70 F | Limestone powder, average particle diameter: 4.5 µm | Mineral component | Schön und Hippelein | 15 |
| Calcifin 20 H | Limestone powder, surface-hydrophobised with stearic acid, average particle diameter: 4.4 µm | Mineral component | Alpha-Calcit | 16 |
| HDK H 18 | Highly dispersed silicic acid, surface-silanised | Mineral component | Wacker | 1.6 |

TABLE 5

Composition of the commercially available parquet adhesive SMP-930 (Stauf Klebstoffwerk GmbH; proportions in percent by mass)

| Raw material | Chemistry | Function | Manufacturer | Proportion [%] |
|---|---|---|---|---|
| S 203 H | Dimethoxymethylsilane-terminated polypropylene oxide oligomer; MW: approx. 12,000 g/mol | Binding agent, basic polymer | Kaneka | 3 |
| S 303 H | Dimethoxymethylsilane-terminated polypropylene | Binding agent, basic polymer | Kaneka | 16 |

TABLE 5-continued

Composition of the commercially available parquet adhesive SMP-930
(Stauf Klebstoffwerk GmbH; proportions in percent by mass)

| Raw material | Chemistry | Function | Manufacturer | Proportion [%] |
|---|---|---|---|---|
| | oxide oligomer; MW: approx. 18,000 g/mol | | | |
| Dynasylan VTMO | Vinyl trimethoxysilane | Drying agent | Degussa | 0.8 |
| KBM 603 | N-2-(aminoethyl)-3-aminopropyltrimethoxysilane | Adhesion promoter | Shin-Etsu | 0.8 |
| Neostann U 220 H | Dibutyltin diacetylacetonate | Catalyst | Nitto Kasei | 0.32 |
| Irganox 1726 | 4,6-bis(dodecylthiomethyl)-o-cresol | Antioxidant | Ciba | 0.1 |
| Palatinol 10-P | bis(2-propylheptylphthalate) | Plasticizer | BASF | 11 |
| Mesamoll | Phenolalkylsulphonic acid ester | Plasticizer | Bayer | 4 |
| Thixatrol MAX | Polyamide wax | Rheological additive | elementis | 0.5 |
| Omyacarb 10 BG | Limestone powder, average particle diameter: 7 µm | Mineral component | Omya | 19.5 |
| Calcifin 20 H | Limestone powder, surface-hydrophobised with stearic acid, average particle diameter 4.4 µm | Mineral component | Alpha-Calcit | 41.58 |
| Socal 312 | Precipitated calcium carbonate, coated, average particle diameter: 0.07 µm | Mineral component | Solvay | 2.4 |

What is claimed is:

1. A water-, solvent- and plasticizer-free, one-component parquet adhesive comprising:
 a) 12 to 36% by mass of a first moisture-reactive, silane-terminated polyalkylene oxide binding agent with an average molecular weight of 6,000 to 20,000 g/mol, wherein silane functions of the first moisture-reactive, silane-terminated polyalkylene oxide binding agent are bonded via alkyl groups to an oligomeric skeletal structure,
 b) 2 to 18% by mass of a second moisture-reactive, silane-terminated polyalkylene oxide binding agent with an average molecular weight of 300 to 3,000 g/mol, wherein silane functions of the second moisture-reactive, silane-terminated polyalkylene oxide binding agent are bonded via alkyl groups to the oligomeric skeletal structure,
 c) 30 to 60% by mass of a surface-hydrophobised marble powder with an average particle diameter of 0.8 µm to 4.0 µm,
 d) 2 to 10% by mass of a surface-hydrophobised chalk powder with an average particle diameter of 0.2 to 0.7 µm,
 e) 0.1 to 1.0% by mass of a hardening catalyst,
 f) 0.2 to 3% by mass of a moisture-reactive, silane-modified drying agent, and
 g) 0.2 to 3% by mass of a moisture-reactive, silane-modified adhesion promoter,
 wherein a sum of the components a) to g) is from 46.5% to 100%, and wherein the adhesive comprises no non-reactive liquid extenders.

2. The water-, solvent- and plasticizer-free, one-component parquet adhesive according to claim 1, wherein a mass ratio of component a) to component b) is from 2:1 to 4:1 and a mass ratio of component c) to component d) is from 8:1 to 18:1.

3. The water-, solvent- and plasticizer-free, one-component parquet adhesive according to claim 1, wherein the terminal silane groups of the first silane-terminated polyalkylene oxide binding agent are dimethoxymethylsilane groups, the polymeric skeletal structure is polypropylene oxide, and the average molecular weight of the first silane-terminated polyalkylene oxide binding agent is 10,000 g/mol.

4. The water-, solvent- and plasticizer-free, one-component parquet adhesive according to claim 1, wherein the terminal silane groups of the second silane-terminated polyalkylene oxide binding agent are dimethoxymethylsilane groups, the polymeric skeletal structure is polypropylene oxide, and the average molecular weight of the second silane-terminated polyalkylene oxide binding agent is 1,000 g/mol.

5. The water-, solvent- and plasticizer-free, one-component parquet adhesive according to claim 1, wherein the marble powder has an average particle size of 2.0 µm, and the chalk powder has an average particle size of 0.4 µm.

6. The water-, solvent- and plasticizer-free, one-component parquet adhesive according to claim 1, wherein a viscosity of the adhesive is 91,200±6,300 mPa·s.

7. The water-, solvent- and plasticizer-free, one-component parquet adhesive according to claim 1, wherein a shear strength of the adhesive is 2.11±0.22 N/mm$^2$.

8. The water-, solvent- and plasticizer-free, one-component parquet adhesive according to claim 1, in combination with one or more parquet, wooden floor coverings or wood-based material boards glued to a sub-floor.

9. The water-, solvent- and plasticizer-free, one-component parquet adhesive according to claim 1, in combination with one or more parquet, wooden floor coverings or wood-based material boards glued to a sub-floor.

10. The water-, solvent- and plasticizer-free, one-component parquet adhesive according to claim 9, wherein the sub-floor is dry or moist and consists of mastic asphalt, concrete, cement, cement screed, cement liquid screed, cement mortar, cement-bonded wood fibre, ceramic, natural stone, calcium sulphate screed, calcium sulphate liquid screed, magnesite screed, wood, wood-based material, plywood, cork, gypsum, gypsum fibre, gypsum plasterboard, hardboard, knifing filler, textile fibrous material, polymeric material, primer or a combination of these sub-floors and the glued parquet, the wooden floor coverings or wood-based material boards are treated or untreated with treatment agents for wooden floor surfaces and consist totally or partially of deciduous or coniferous types of timber or a combination of these types of timber.

11. A water-, solvent- and plasticizer-free, one-component parquet adhesive comprising:
   a) 23 to 33% by mass of a first moisture-reactive, silane-terminated polyalkylene oxide binding agent with an average molecular weight of 7,000 to 13,000 g/mol, wherein silane functions of the first moisture-reactive, silane-terminated polyalkylene oxide binding agent are bonded via alkyl groups to an oligomeric skeletal structure,
   b) 7 to 13% by mass of a second moisture-reactive, silane-terminated polyalkylene oxide binding agent with an average molecular weight of 700 to 1,300 g/mol, wherein silane functions of the second moisture-reactive, silane-terminated polyalkylene oxide binding agent are bonded via alkyl groups to the oligomeric skeletal structure,
   c) 48 to 60% by mass of a surface-hydrophobised marble powder with an average particle diameter of 1.0 µm to 3.0 µm,
   d) 3 to 7% by mass of a surface-hydrophobised chalk powder with an average particle diameter of 0.3 to 0.6 µm,
   e) 0.15 to 0.29% by mass of a hardening catalyst,
   f) 0.5 to 1.5% by mass of a moisture-reactive, silane-modified drying agent, and
   g) 0.5 to 1.5% by mass of a moisture-reactive, silane-modified adhesion promoter,
   wherein a sum of the components a) to g) is from 82.15% to 100%.

12. The water-, solvent- and plasticizer-free, one-component parquet adhesive according to claim 11, wherein a mass ratio of component a) to component b) is from 2:1 to 4:1 and a mass ratio of component c) to component d) is from 8:1 to 18:1.

13. The water-, solvent- and plasticizer-free, one-component parquet adhesive according to claim 11, wherein the terminal silane groups of the first silane-terminated polyalkylene oxide binding agent are dimethoxymethylsilane groups, the polymeric skeletal structure is polypropylene oxide, and the average molecular weight of the first silane-terminated polyalkylene oxide binding agent is 10,000 g/mol.

14. The water-, solvent- and plasticizer-free, one-component parquet adhesive according to claim 11, wherein the terminal silane groups of the second silane-terminated polyalkylene oxide binding agent are dimethoxymethylsilane groups, the polymeric skeletal structure is polypropylene oxide, and the average molecular weight of the second silane-terminated polyalkylene oxide binding agent is 1,000 g/mol.

15. The water-, solvent- and plasticizer-free, one-component parquet adhesive according to claim 11, wherein the marble powder has an average particle size of 2.0 µm, and the chalk powder has an average particle size of 0.4 µm.

16. The water-, solvent- and plasticizer-free, one-component parquet adhesive according to claim 11, wherein a viscosity of the adhesive is 91,200±6,300 mPa·s.

17. The water-, solvent- and plasticizer-free, one-component parquet adhesive according to claim 11, wherein a shear strength of the adhesive is 2.11±0.22 N/mm$^2$.

18. A water-, solvent- and plasticizer-free, one-component parquet adhesive comprising:
   a) 12 to 36% by mass of a first moisture-reactive, silane-terminated polyalkylene oxide binding agent comprising dimethoxymethylsilane groups, the first moisture-reactive, silane-terminated polyalkylene oxide binding agent has an average molecular weight of 10,000 g/mol, wherein silane functions of the first moisture-reactive, silane-terminated polyalkylene oxide binding agent are bonded via alkyl groups to an oligomeric skeletal structure,
   b) 2 to 18% by mass of a second moisture-reactive, silane-terminated polyalkylene oxide binding agent comprising dimethoxymethylsilane groups, second moisture-reactive, silane-terminated polyalkylene oxide binding agent having an average molecular weight of 1,000 g/mol, wherein silane functions of the second moisture-reactive, silane-terminated polyalkylene oxide binding agent are bonded via alkyl groups to the oligomeric skeletal structure, wherein a mass ratio of component a) to component b) is from 2:1 to 4:1,
   c) 30 to 60% by mass of a surface-hydrophobised marble powder with an average particle size of 2 µm,
   d) 2 to 10% by mass of a surface-hydrophobised chalk powder with an average particle size of 0.4 µm, wherein a mass ratio of component c) to component d) is from 8:1 to 18:1,
   e) 0.1 to 1.0% by mass of a hardening catalyst,
   f) 0.2 to 3% by mass of a moisture-reactive, silane-modified drying agent, and
   g) 0.2 to 3% by mass of a moisture-reactive, silane-modified adhesion promoter,
   wherein, a sum of the components a) to g) is from 46.5% to 100%, and wherein the adhesive comprises no non-reactive liquid extenders;
   wherein a viscosity of the adhesive is 91,200±6,300 mPa·s.
   wherein a shear strength of the adhesive is 2.11±0.22 N/mm$^2$.

19. A method comprising gluing parquet, wooden floor coverings or wood-based material boards to a sub-floor using the water-, solvent- and plasticizer-free, one-component parquet adhesive according claim 1.

20. The method according to claim 19, wherein the sub-floor is dry or moist and consists of mastic asphalt, concrete, cement, cement screed, cement liquid screed, cement mortar, cement-bonded wood fibre, ceramic, natural stone, calcium sulphate screed, calcium sulphate liquid screed, magnesite screed, wood, wood-based material, plywood, cork, gypsum, gypsum fibre, gypsum plasterboard, hardboard, knifing filler, textile fibrous material, polymeric material, primer or a combination of these sub-floors and the glued parquet, the wooden floor coverings or wood-based material boards are treated or untreated with treatment agents for wooden floor surfaces and consist totally or partially of deciduous or coniferous types of timber or a combination of these types of timber.

* * * * *